United States Patent

Kritz et al.

[15] 3,648,225

[45] Mar. 7, 1972

[54] DIGITAL SONAR DOPPLER NAVIGATOR

[72] Inventors: Jacob A. Kritz, Westbury; Seymour D. Lerner, Plainview, both of N.Y.

[73] Assignee: Sperry Rand Corporation

[22] Filed: Dec. 4, 1969

[21] Appl. No.: 882,242

[52] U.S. Cl. ................................. 340/3 D, 340/3 R, 343/9
[51] Int. Cl. ................................................ G01s 9/66
[58] Field of Search ..................... 340/3, 3 D; 343/9, 8

[56] References Cited

UNITED STATES PATENTS

3,491,333   1/1970   Goulet et al. ..................... 340/3 D

*Primary Examiner*—Richard A. Farley
*Attorney*—S. C. Yeaton

[57] ABSTRACT

A "Janus-type" sonar Doppler navigator employs a transmitter for energizing four acoustic transducers that propagate beams in the fore, aft, port and starboard directions, respectively. Individual acoustic receivers corresponding to each of the beams supply electrical signals to a pair of incremental distance computers. The transmitter frequency and water temperature are monitored in a compensator circuit to provide corrections for variations in these quantities. The received associated signals are also applied to a spectrum evaluator for analysis of the spectral content of the received signals. Each incremental distance computer digitizes the received signals, corrects these signals in response to the output of the temperature and frequency compensator, and integrates the digitized signals throughout a time interval determined by an interval generator to provide tentative incremental distance voltages representative of the distance traveled during the corresponding time interval. If the spectral content of the received signals is satisfactory, the spectrum generator produces an UPDATE pulse that permits a readout capacitor to charge to the level of the tentative incremental distance voltage. If the spectral content is not satisfactory, the spectrum evaluator produces a RETAIN signal that permits the readout capacitor in each incremental distance computer to remain charged to the value of a previously stored signal. The voltages on the readout capacitors in both incremental distance computers are applied to further computer means for providing indications of the total distance traveled and the drift angle.

17 Claims, 7 Drawing Figures

INVENTORS
JACOB A. KRITZ
SEYMOUR D. LERNER
BY Joseph K. Roehl
ATTORNEY

INVENTORS
JACOB A. KRITZ
SEYMOUR D. LERNER
ATTORNEY

DIGITAL SONAR DOPPLER NAVIGATOR

BACKGROUND OF THE INVENTION

1. Field of the Invention

This invention relates to sonar Doppler navigators and more specifically to Janus-type sonar Doppler navigators.

2. Description of the Prior Art

A variety of sonar Doppler navigators are known in the prior art. One class of such navigators has been generically labeled a "Janus-type" navigator.

A basic description of this type of Doppler system may be found, for instance, in an article entitled: "Ultrasonic Doppler for Distance Measurement" written by Melvin Wachspress and appearing in Volume UE-8, No. 1 of the IRE Transactions on Ultrasonic Engineering for Mar., 1961. In this article, the author describes the action of measuring equipment using "-forward looking" and "rearward looking" ultrasonic beams for measuring motion in a plane containing both beams.

Complete sonar Doppler navigators in this class and intended for shipboard use employ four beams of acoustic energy directed downwardly from the hull of the vessel. Two of the beams propagate in opposite directions in the plane of the fore-aft (longitudinal) axis of the vessel and the other two beams propagate in opposite directions along the port-starboard (traverse) axis of the vessel. The beams are reflected from the bottom of the body of water, such as the ocean floor, in which the vessel is traveling so that the beams can be detected by individual receiving transducers. As taught in the prior art, each signal becomes Doppler shifted in accordance with the horizontal motion of the vessel. The fore-aft signals are combined and processed to produce an analog voltage whose magnitude represents the instantaneous value of the velocity of the vessel along this given axis. The port-starboard signals are similarly combined and processed to provide the same information in the port-starboard axis.

The combination of two oppositely directed beams along each axis compensates for rolling and pitching of the vessel as has been shown in the prior art. The known prior art systems, however, are subject to error.

The acoustic characteristics of the water vary with temperature. The velocity of propagation of sound in water for instance, is particularly sensitive to temperature. Some of the prior art systems are subject to significant errors because of this phenomena.

The acoustic waves are further affected by localized water conditions. Turbulence or aeration in an area of the water through which the beam is propagating, for instance, may disturb the acoustic beam sufficiently to create significant errors. Since prior art systems provide signals representing instantaneous velocity, there is no opportunity to determine the reliability of the received signals before they are applied to indicating elements in the system.

Furthermore, prior art analog systems require extremely stable amplifiers and other components since the magnitude of the analog voltage is used in such systems as the variable to be measured. The high degree of stability required in these systems increases the complexity and cost of the navigator.

SUMMARY OF THE INVENTION

According to the principles of the present invention, horizontal motion of a vessel through or in a body of water is determined by providing means to receive Doppler-shifted signals along the fore-aft and port-starboard axes of the vessel, digitizing the received Doppler-shifted signals, adjusting the energy content of the pulses in the digitized signals in accordance with water temperature and transmitter frequency, integrating the digitized signals in separate integrating means throughout a given period of time to obtain an indication of the incremental distance traveled along each axis during the given period of time and temporarily storing these integrated signals. If desired, the spectral content of the received signals may be evaluated and used to accept or reject the corresponding integrated signals. If the spectral content is satisfactory, the corresponding integrated signals are processed and used to indicate magnitude and direction of the distance traversed by the vessel. If the spectral content is not satisfactory, previously stored integrated signals are used as an estimate of this magnitude and direction.

DESCRIPTION OF THE PRESENTLY PREFERRED EMBODIMENT

The present invention utilizes pairs of acoustic generators and acoustic receivers designed to be integrally mounted on the hull of a vessel so as to radiate energy in the plane of the fore-aft axis and in the plane of the port-starboard axis of the vessel. Although this particular orientation is presently preferred, it will be appreciated that the axes of propagation may be oriented at a different angle with respect to the longitudinal axis of the vessel if desired, and the necessary corrections made when calculating the results of the measurement.

The fore-aft, port-starboard orientation will be described throughout the present application as a matter of convenience. However, it will be understood that the above-mentioned rotation of axes may be used as desired.

Figure 1:
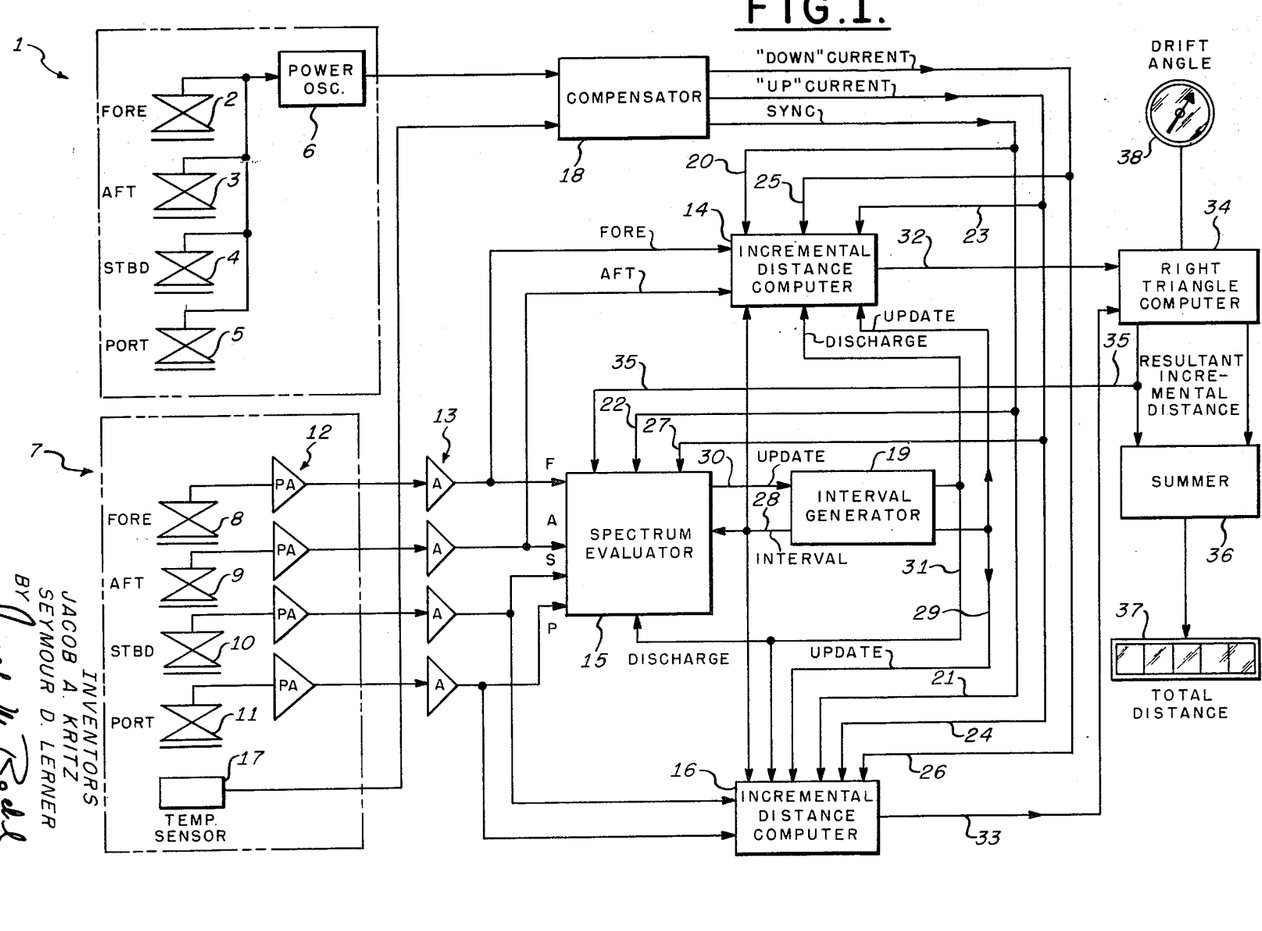
FIG. 1 is a block diagram illustrating the presently preferred embodiment of the invention.

Referring now to FIG. 1, the transmitting transducer assembly 1 contains four acoustic generators 2, 3, 4 and 5 driven by a suitable power oscillator 6.

A receiving transducer assembly 7 contains four corresponding acoustic receivers 8, 9, 10 and 11.

The four acoustic generators are oriented so as to produce acoustic beams directed angularly downward toward the bottom of the body of water in which the vessel is traveling. The beams also are directed along axes as indicated with respect to each of the acoustic generators. Thus the acoustic generator 2 produces a beam which propagates toward the bow of the vessel whereas the acoustic generator 3 produces a beam that propagates in the aft direction toward the stern of the vessel. Similarly, the acoustic generators 4 and 5 produce beams that propagate in the starboard and port directions respectively.

The acoustic receivers in the assembly 7 are similarly labeled so as to indicate the particular receiver adapted to receive acoustic energy from the corresponding generator in the assembly 1.

As practiced in a Janus system, pairs of acoustic beams travel in opposite directions along each of the selected axes. If the vessel progresses in the forward direction, the Doppler shift tends to increase the frequency of the signal as detected by the acoustic receiver 8 and to decrease the frequency of the signal detected by the acoustic receiver 9. A similar phenomenon occurs with respect to the port and starboard elements for motion along the transverse axis of the vessel. Thus the fore and aft generators 2 and 3 may be considered as propagating a first pair of correlative acoustic beams and the port and starboard generators 4 and 5 may be considered as producing a second pair of correlative beams.

Output signals from the acoustic receivers are amplified in individual preamplifiers 12. Output signals from the preamplifiers may be again amplified in a group of amplifiers 13 so as to bring the signals to a level required for operation of the remaining circuits.

The fore and aft signals constitute a first pair of correlative input signals. These signals are applied to a first incremental distance computer 14 and to a spectrum evaluator 15. The port and starboard signals constitute a second pair of correlative input signals and these signals are applied to a second incremental distance computer 16 as well as the spectrum evaluator 15. A temperature sensor 17 monitors the temperature of the water near the acoustic receivers. A signal from the temperature sensor is applied to a temperature and frequency compensator 18 which produces "up" and "down" currents in accordance with temperature variations in the vicinity of the temperature sensor 17. These currents are used to correct the results for water temperature variations in a manner that will be described later.

A signal is also taken from the power oscillator 6 and applied to the compensator 18 so as to provide compensation for variation of the transmitter frequency.

An interval generator 19 determines time intervals during which measurements are to be taken. A frequency-compensating signal from the compensator 18 is applied to the incremental distance computers 14 and 16 through the lines 20 and 21 respectively and to the spectrum generator through the line 22.

The "up" and "down" currents are also applied to the incremental distance computers 14 and 16 through the lines 23 and 24 and through the lines 25 and 26 respectively. The "up" current is also applied to the spectrum evaluator 15 through a line 27.

The interval generator 19 produces an interval pulse to initiate a measuring interval. This pulse is applied by means of a line 28 to the spectrum evaluator and the two incremental distance computers. The interval generator also produces an UPDATE pulse which is applied to the incremental distance computers by means of a line 29 in response to an UPDATE signal from the spectrum evaluator through the line 30.

The spectrum evaluator 15 analyzes the spectral content of the incoming signals as will be explained later. If the spectral characteristics of the input signals are unsatisfactory, the spectrum evaluator produces a RETAIN pulse on the line 30 which prevents the interval generator from producing an UPDATE pulse.

Finally, the interval generator produces a DISCHARGE pulse which is applied to the incremental distance computers and the spectrum evaluator through a line 31.

As will be explained later, the incremental distance computers compute the distance traveled in each of the ship axes within a prescribed time interval determined by the interval generator 19. During normal operation, a voltage is produced on the line 32 that represents the distance traveled in the fore-aft direction during the appropriate time interval and a second DC voltage is produced on the line 33 at the output of the incremental distance computer 16 which represents the incremental distance traveled in the port-starboard direction during the same time interval. By dividing the total distance traveled into small segments, it becomes possible to permit an evaluation of the authenticity of the received acoustic signals. Momentary deteriorations of the signal can thus be detected and the corresponding incremental distance may then be rejected.

The incremental distance signals from the computers 14 and 16 are applied to a right triangle computer 34 through the lines 32 and 33. A previously stored resultant incremental distance signal appears in the right triangle computer 34 and is applied to the spectrum evaluator as a stored distance signal on the line 35. This signal is also applied to a summer 36 which serves to integrate the incremental distance signals so that an indication of the total distance traveled may be displayed on a readout means 37. The drift angle may be also computed in the computer 34 and displayed on a meter 38. The computer 34 and the summer 36 constitute a computation means which functions in a manner to be described. However, it will be appreciated that many varieties of computation means may be used for this purpose.

Figure 2:
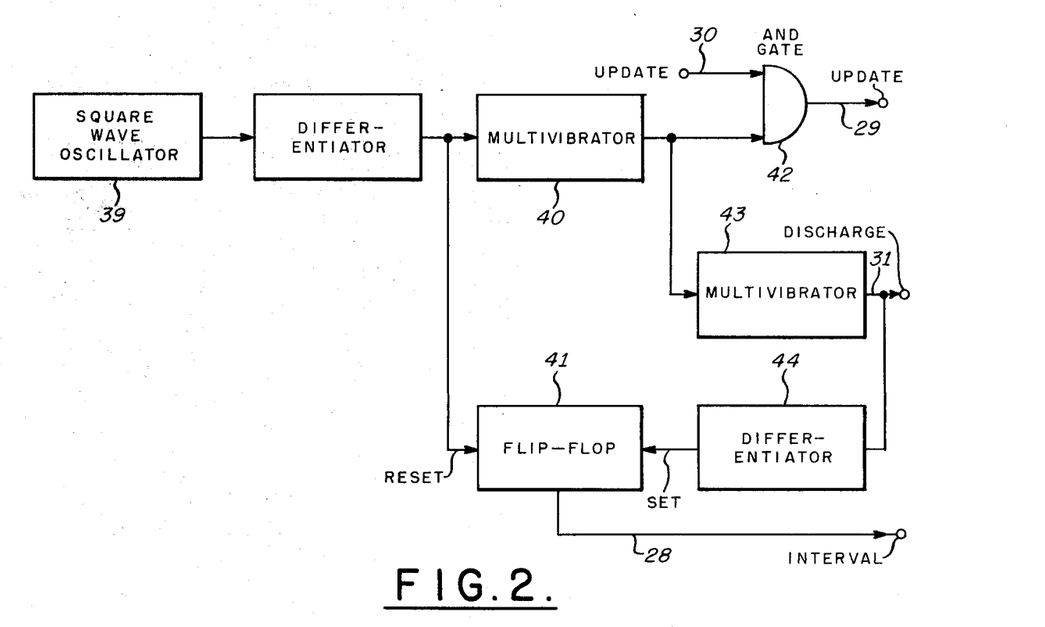
FIG. 2 is a block diagram of an interval generator useful in practicing the invention.

FIG. 2 illustrates a presently preferred form of the interval generator 19. The interval generator establishes a time interval over which the incremental distance is measured. The device produces a time interval pulse for use by the incremental distance computers and the spectrum evaluator.

The interval generator also produces an UPDATE pulse on the line 29 which transfers a new incremental distance to the outputs of the incremental distance computers 14 and 16 if the spectrum associated with the new input signals is satisfactory.

The interval generator also produces a DISCHARGE pulse on the line 31 which restores working capacitors in the incremental distance computers to zero charge after updating.

The interval generator contains a square wave oscillator 39 that typically produces waves having a period of several hundred milliseconds. These waves are then differentiated and the resultant negative-going spikes are used to trigger a monostable multivibrator 40 and to reset a flip-flop 41. The multivibrator 40 typically produces a 2-millisecond pulse which is applied to an AND-gate 42. If an UPDATE signal is being applied from the spectrum evaluator 15 through the line 30 at that time, an UPDATE pulse is produced on the line 29. If, however, a RETAIN signal is being applied to the AND-gate 42 at that time, no pulse will appear on the line 29.

The trailing edge of the output pulse from the multivibrator 40 triggers a second monostable multivibrator 43 which typically produces a 2-millisecond discharge pulse for application to the incremental distance computers 14 and 16 through the line 31. The output of the multivibrator 43 is also applied to a differentiator 44. The differentiator 44 produces a pulse which sets the flip-flop 41 in response to the trailing edge of the pulse from the multivibrator 43. The flip-flop 41 is reset by the next negative-going edge of the square wave generator output voltage to terminate the measuring interval. The output voltages from the flip-flop 41 provide signals on the line 28 which are applied to the interval gate terminals of the incremental distance computer and the spectrum evaluator.

Assuming the typical values mentioned previously, the termination of a given output wave from the oscillator 39 resets the flip-flop 41 so as to terminate a corresponding interval gate signal. This constitutes the end of a measurement interval. At the same time, the multivibrator 40 is triggered so as to produce an UPDATE pulse if the gate 42 is enabled. Thus if an UPDATE pulse occurs at all, it occurs after the measurement interval is complete. After 2 milliseconds, the multivibrator 40 switches to its quiescent state. This terminates any UPDATE pulse and triggers the multivibrator 43 so as to initiate a DISCHARGE pulse. The DISCHARGE pulse prepares the system for a new measurement interval. After another 2-millisecond interval, the multivibrator 43 switches to its quiescent state. This terminates the DISCHARGE pulse and sets the flip-flop 41 so as to initiate a new measurement interval.

Figure 3:
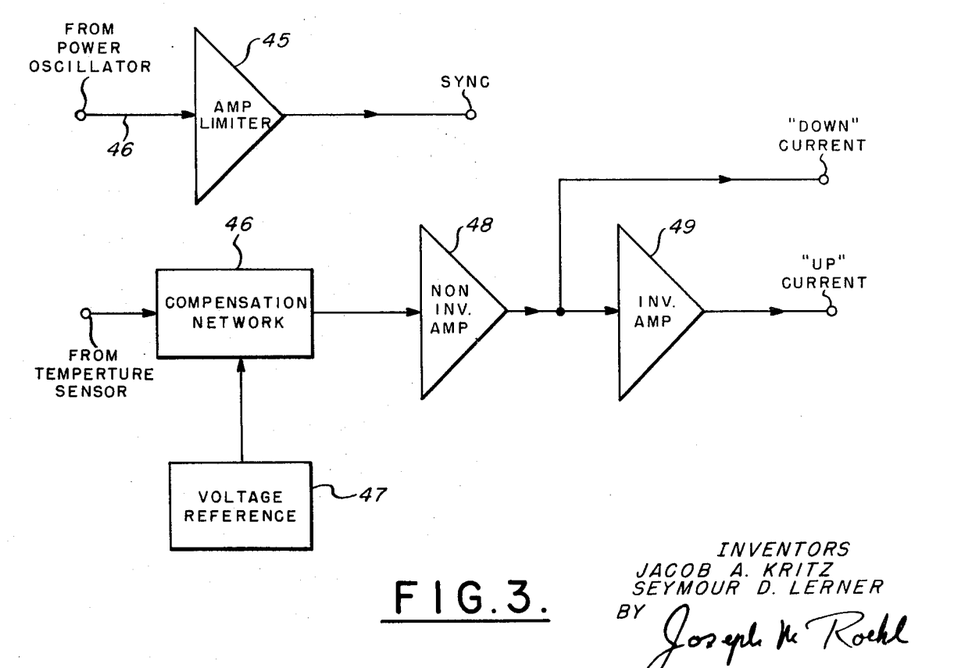
FIG. 3 is a block diagram of a temperature and frequency compensator useful in practicing the invention.

FIG. 3 illustrates the details of the temperature and frequency compensator 18. The oscillator signal from the transmitter 6 is applied to a clock amplifier-limiter 45 through a line 46. The clock amplifier-limiter provides pulses at the repetition rate of the power oscillator 6 which are suitable for compensating the processing circuits for variations in repetition rate of the oscillator 6.

Signals from the temperature sensor are applied to a water temperature compensation network 46 which also employs a voltage reference 47. The output voltage from the compensation network 46 is amplified in a first amplifier 48 and then applied to the "down" current control line. The output of the amplifier 48 is also applied to an inverting amplifier 49. The output of the inverting amplifier is then applied to the "up" current control line. Thus a pair of oppositely polarized water-temperature-sensitive DC voltages are produced for use by the incremental distance computers 14 and 16 and the spectrum evaluator 15.

Figure 4:
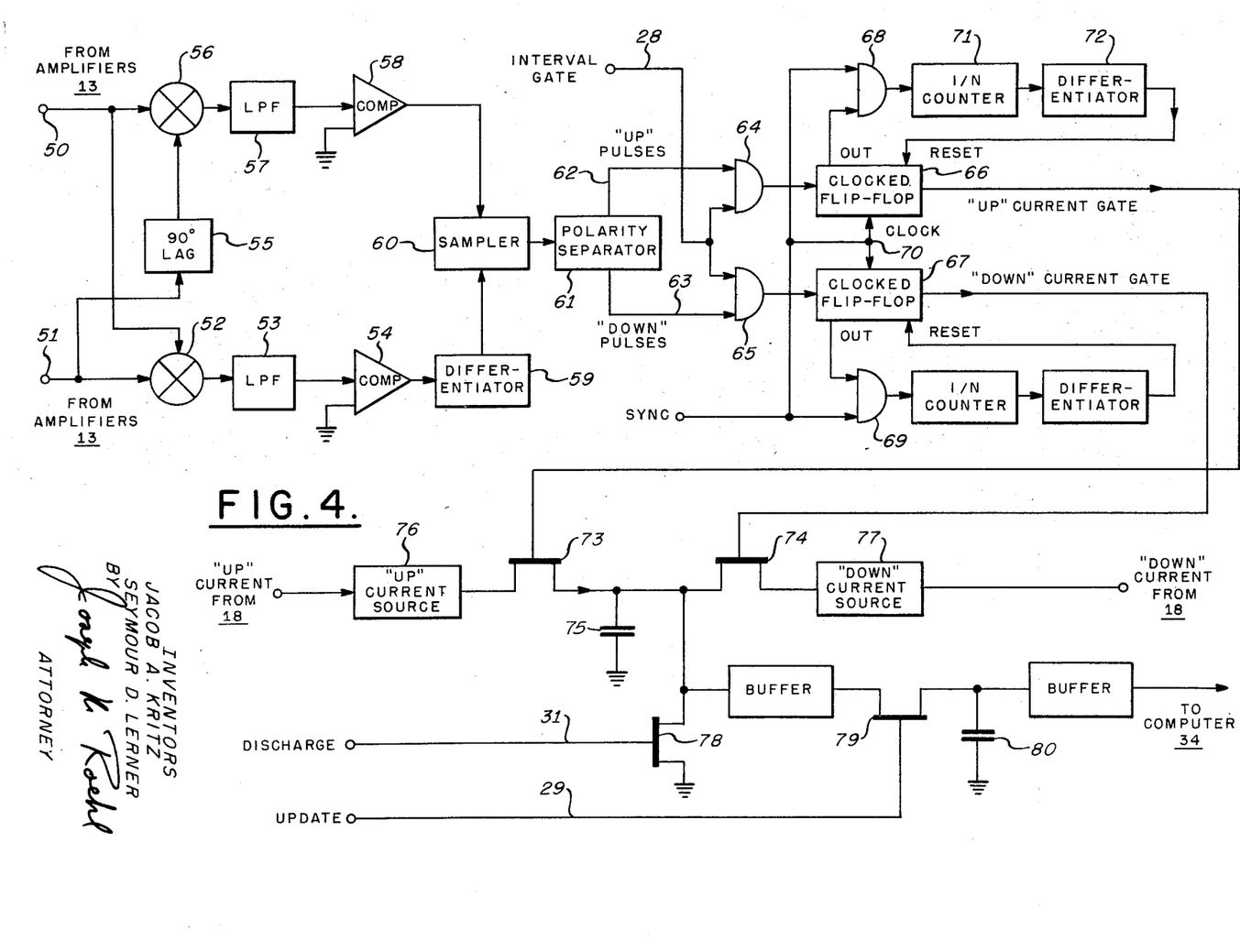
FIG. 4 is a block diagram of an incremental distance computer useful in practicing the invention.

FIG. 4 illustrates the presently preferred embodiment of an incremental distance computer. The incremental distance computers 14 and 16 are identical so that the circuit of FIG. 4 applies to each of these components.

Each incremental distance computer effectively computes the distance traveled along the corresponding axis during a prescribed interval. By segmenting the total distance traveled in this fashion, it is possible to inspect each increment for authenticity and to accept or reject this increment accordingly.

A pair of correlative input signals, such as the fore-aft signals, are applied to input terminals 50 and 51. The signal applied to the terminal 51 is heterodyned with a signal applied to the terminal 50 in a first mixer 52. The difference frequency in the signal from the mixer 52 passes through a low-pass filter 53 and is applied to a comparator 54. The comparator 54 is a high-gain amplifier which converts the sinusoidal waves applied to its input terminals to square waves that are synchronized with the sinusoidal input signals.

The signals applied to the input terminal 51 are also passed through a 90° phase shift network 55 and heterodyned with the signals applied to the input terminal 50 in a mixer 56. The output of the mixer 56 is passed through a low-pass filter 57 and to a second comparator 58. The output of the comparator 58 is a square wave similar to the signal produced at the output of the comparator 54 but in quadrature with the signal from the comparator 54. It can be shown that the signal from the comparator 58 will lead or lag the signal from the comparator 54 dependent upon which input signal has the higher frequency. In other words, the signal from the comparator 58 will lead or lag the signal from the comparator 54 depending upon the direction of motion of the vessel along the appropriate axis.

The signal from the comparator 54 is differentiated in a differentiator 59 to produce positive and negative-going spikes. The positive-going pulses are used as sampling pulses in a bridge-sampling network 60 to sample the signals from the comparator 58. Thus, if the phase of the signals from the comparator 58 have been shifted in one direction, positive-going pulses will be provided by the sampling network 60. If the pulses from the comparator 58 have been shifted in the opposite direction, negative-going pulses will be provided by the sampling network 60. The signals from the sampling network 60 are applied to a polarity separator network 61. This network provides a negative "up" pulse on line 62 for each positive sampler output and a negative "down" pulse on line 63 for each negative sampler output.

Due to the finite beamwidth of the acoustic transmissions, motion of the vessel in a given direction will produce both "up" and "down" pulses. However, when conditions are normal most of the pulses will be of the same polarity. It can be shown that, in any event, the true motion corresponds precisely to the difference between the positive and negative pulse rates.

The pulses on the lines 62 and 63 are applied to AND-gates 64 and 65 respectively along with signals from the interval generator on the line 28. The signals from the AND-gates 64 and 65 are thus applied to clocked flip-flops 66 and 67 during a measurement interval.

Signals from the temperature and frequency compensator 18 are applied to a pair of AND-gates 68 and 69 by means of the sync line. The sync signals are also applied to the clock input terminals of the clocked flip-flops 66 and 67 through a line 70. A pulse from an AND-gate 64 or 65 prepares the corresponding clocked flip-flop for a change of its output state. This change is actually triggered by the following sync pulse from the temperature and frequency compensator 18. When a clocked flip-flop is switched in this fashion, an output signal is produced which enables an AND-gate 68 or 69 as the case may be, and permits succeeding sync pulses to pass to a divider counter such as the counter 71. Typically, these counters "overflow" and produce an output signal after counting 50 sync pulses. The output pulse from a counter is differentiated in a differentiator 72 or its counterpart in the circuit of flip-flop 67 so as to gate off subsequent sync pulses. It should be noticed that the "up" and "down" pulses applied to the AND-gates 64 and 65 occur at an audio rate since they are the result of a heterodyning action whereas the sync pulses occur at the frequency of the oscillator. Thus each "up" or "down" pulse occurring during a measurement interval produces a corresponding current gate pulse at the output of a clocked flip-flop that has a duration equal to a specified number of oscillator cycles. In other words, the duration of the current gating pulses is corrected for variations in oscillator frequency. The current gate signals from the flip-flops 66 and 67 are applied to "up" and "down" switches 73 and 74 respectively. These switches are conventional, and may for instance, be FET switches if desired.

The switches 73 and 74 permit a working capacitor 75 to become charged from an "up" or a "down" current source 76 or 77. The current source 76 or the current source 77 provides a charging voltage which is adjusted in accordance with the "up" current signal or the "down" current signal from the temperature and frequency compensator. The current sources are conventional devices that provide a specified current regardless of the impedance of the load applied to them.

By virtue of control of magnitude and width of the current pulses by water temperature and transmitter frequency respectively, the working capacitor 75 will be charged to a level dependent only on vessel motion and independent of the temperature of the water as sensed by the sensor 17, and the frequency of the power oscillator 6. The polarity of the charge on the capacitor will be dependent upon the direction of motion of the vessel during the measurement interval.

If an UPDATE pulse is produced by the interval generator at the termination of a measurement interval, it is applied to an UPDATE switch 79 through the line 29 so as to transfer the charge on the working capacitor 75 to a readout capacitor 80. The voltage on the readout capacitor 80 is then available for use in the computation circuits through the line 81.

Before the start of a new measurement interval, a DISCHARGE pulse from the interval generator 19 is applied to a discharge switch 78 through the line 31.

It is well known in the Doppler navigation art, that the acoustic signals returned to the system contain frequency components scattered throughout a certain spectrum. Under normal conditions, the width of this spectrum increases in proportion to the velocity of the vehicle. If undue aeration, turbulence, or the like is encountered, however, the spectral width of the return signal increases dramatically. At the same time, this aeration, etc., also causes erroneous readings.

Figure 5:
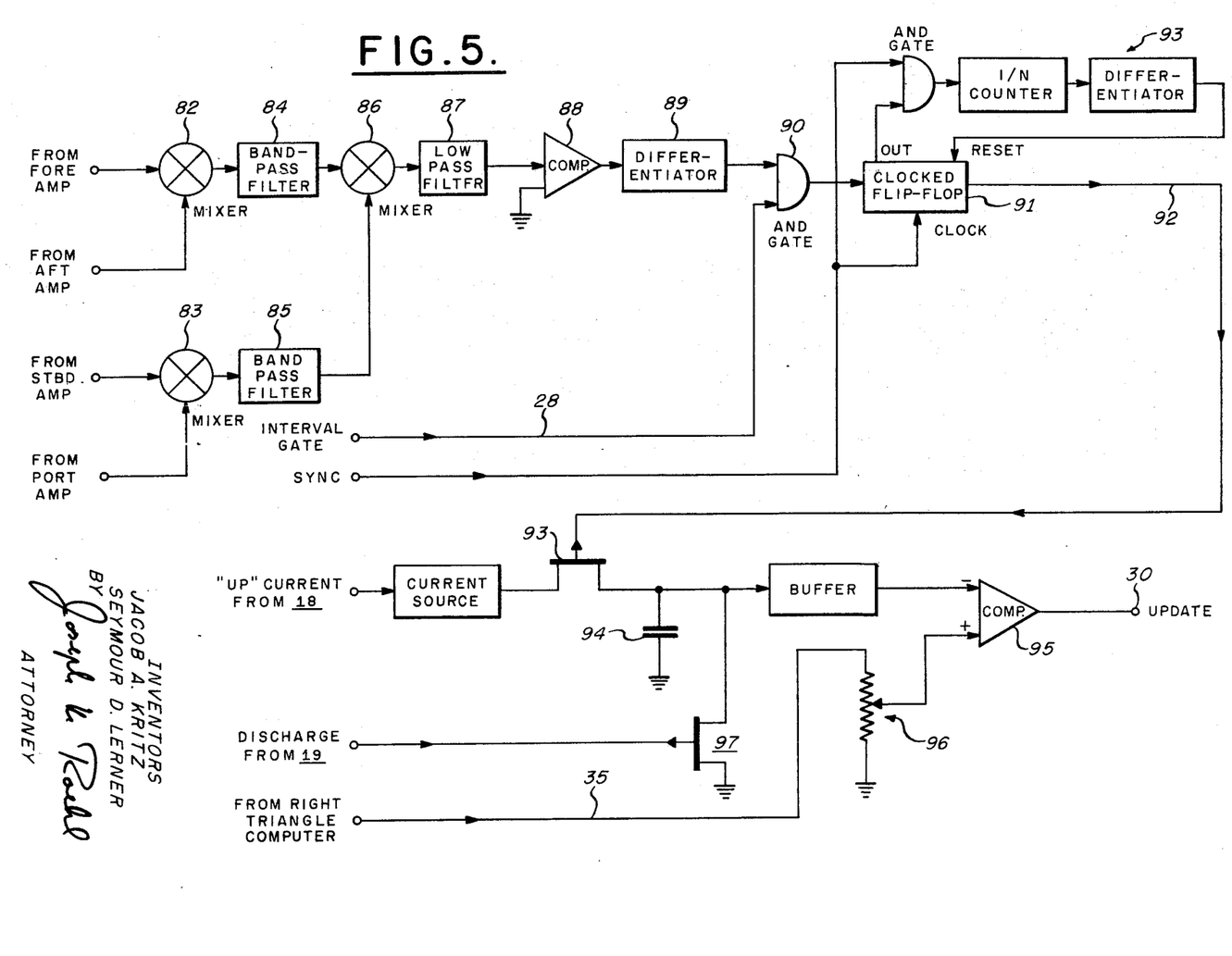
FIG. 5 is a block diagram of a spectrum evaluator useful in practicing the invention.

The spectrum evaluator of FIG. 5 may be used to detect excessive spectral width and to provide signals for rejecting the accompanying Doppler-shifted information.

The spectrum evaluator examines all of the input signals and computes a composite spectral width. Comparison is then made to a maximum allowable spectral width based on the previously stored resultant incremental distance to determine the acceptability of the new distance measurement being produced by the incremental distance computers.

Referring again to FIG. 5, the first pair of correlative input signals are applied to a first mixer 82 and a second pair of correlative input signals are applied to a mixer 83. Each of the signals from the mixers 82 and 83 are passed through band-pass filters 84 and 85. These filters serve to pass the sum frequencies from the mixers. The outputs of filters 84 and 85 are heterodyned in a mixer 86. The difference frequency of the signal from the mixer 86 is extracted in a low-pass filter 87 and converted into square waves in the comparator 88. The comparator 88 again produces an output pulse train having the same zero-crossings as the signal from the filter 87. The number of zero-crossings of the signal from the comparator 88 per unit time is representative of the composite spectral width of the four input signals.

It can be shown that in a Janus system this zero-crossing count is independent of heave, roll, pitch, and yaw motions. When the system is operating properly, the zero-crossing count is determined entirely by transducer element beamwidth and vessel motion. By providing a threshold which varies with stored resultant incremental distance, the spectrum evaluator provides the ability to sense accurately the spectral widening produced by extraneous effects such as severely aerated water.

The output of the comparator 88 is passed through a differentiator 89 to produce spikes in synchronism with the output of the comparator. The output of the differentiator is applied to an AND-gate 90 along with a signal from the interval gate signal from the interval generator on the line 28.

Positive-going signals are gated to clocked flip-flop 91 during the measurement interval. The flip-flop 91 produces output pulses on a line 92 that have a duration of 50 times the transmitter frequency by virtue of the divider circuit 93 which is identical to the divider circuit consisting of the counter 71 and the differentiator 72 previously described with relation to the incremental distance computer illustrated in FIG. 4.

Each positive-going zero-crossing thus produces a voltage block having a duration equal to 50 cycles of the power oscillator output signal.

The signal on the line 92 actuates a switch 93 which gates bursts of current into a capacitor 94 from the current source through the "up" current line from the temperature and frequency compensator 18. The level to which the capacitor charges during the measurement interval is thus a measure of the composite spectral width of the received signals.

The voltage on the capacitor 94 is buffered and applied to a comparator 95.

The stored voltage representing the resultant incremental distance is also applied to the comparator 95 through the line 35. This voltage is adjusted to a suitable level by a potentiometer 96.

If the voltage on the capacitor 94 exceeds this speed-proportional threshold, thus indicating an excessive spectral width, a retain logic state is produced at the comparator 95. Otherwise, an update state is generated and an UPDATE signal is applied to the interval generator 19 through the line 30.

At the conclusion of the measurement interval, the voltage across the capacitor 94 is held for the duration of the update interval. During this update interval, the incremental distances are updated by the corresponding incremental distance computers if the comparator 95 is producing an UPDATE signal. Thereafter, the capacitor 94 is discharged by the interval generator through the switch 97 in response to a discharge signal from the interval generator 19.

Figure 6:
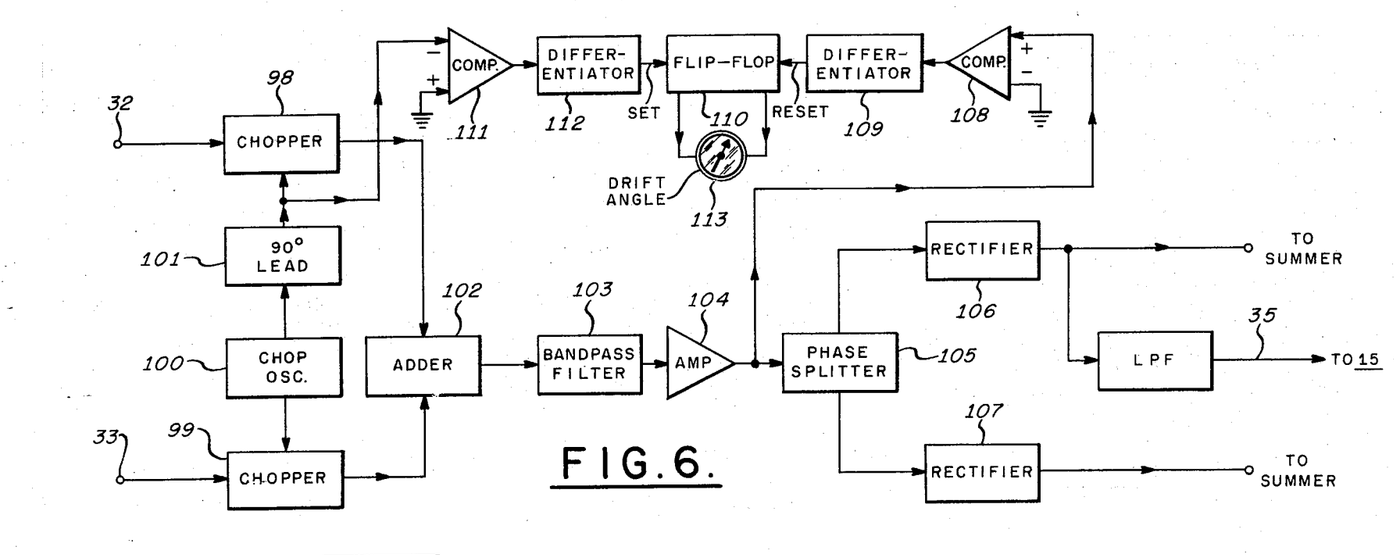
FIG. 6 is a block diagram of a right triangle computer that may be used with the invention.

FIG. 6 illustrates a right-triangle computer that may be used with the present invention.

The right-triangle computer computes, for each of the component incremental distance, a resultant total incremental distance and drift angle. Drift angle may be displayed as a meter deflection. The resultant total incremental distance may be totalized by the summer 36 and displayed as a counter reading. The resultant incremental distance also serves as a threshold reference for use in the spectrum evaluator 15.

In the right-triangle computer pictured in FIG. 6, the incremental distance signal from the incremental distance computer 14 is applied to a first chopper 98 through the line 32. Similarly, the output of the incremental distance computer 16 is applied to a chopper 99 through a line 33. A chopping oscillator 100 actuates the chopper 99 directly. The output of the chopping oscillator 100 is also passed through a 90° phase shift network 101 and then applied to the chopper 98. The output signals from the choppers 98 and 99 are thus square waves having a quadrature relationship. These waves may be represented by vectors at right angles to each other. The sum vector is obtained in an adder 102 and represents the resultant incremental distance. The signal from the adder 102 is passed through a band pass filter 103 to extract the fundamental frequency of the signal from the adder 102. The signal from the filter 103 is amplified in an amplifier 104 and passed to a phase splitter 105. The signals from the phase splitter 105 are then rectified in a pair of rectifiers 106 and 107 to produce dual DC output signals having magnitudes proportional to the resultant incremental distance. These signals are then applied to the summer network 36. The output of the rectifier 106 is also filtered and applied to the spectrum evaluator on the line 35.

The signal from the amplifier 104 is also applied to a comparator 108, differentiated in a differentiator 109 and applied to the reset terminal of a flip-flop 110.

The phase-shifted signal from the phase-shifter 101 is applied to a second comparator 111, differentiated in a differentiator 112 and applied to the set terminal of the flip-flop 110. The comparators 108 and 111 are arranged so that one comparator inverts while the other does not. This permits the set and reset pulses to the flip-flop to occur 180° apart.

A DC volt meter 113 is connected across the output of the flip-flop. As the flip-flop operates, this meter deflects in accordance with the changes in the duty cycle of the square wave produced by the flip-flop.

Drift angle may be defined as the angle that the resultant vector bears to the fore-aft direction.

Consider first a drift angle of 0°, that is, a resultant vector aligned with the longitudinal axis of the vessel. For this case, there is no output from the chopper 99 and the output of the adder 102 is therefore the same as the output of the chopper 98. The two comparator inputs occur simultaneously. However, since one comparator inverts while the other does not, the set and reset pulses applied to the flip-flop 110 occur exactly 180° apart. Since the output of the flip-flop is a symmetrical square wave under these conditions, the voltage wave applied to the meter 113 has zero average value and the drift meter reads zero.

As the drift angle changes, positive-going zero-crossings of the two comparator inputs separate in time by an amount proportional to the drift angle since the output of the adder 102 contains an additional component introduced by the chopper 99. This changes the duty cycle of the output of the flip-flop 110 and thus changes the average value of the rectangular wave applied to the meter 113. Furthermore, the meter deflection will be positive or negative in accordance with the lead or lag nature of the drift. The overall result is a display beginning at −180°, moving linearly and smoothly through zero to +180° and then returning abruptly to −180°.

Figure 7:
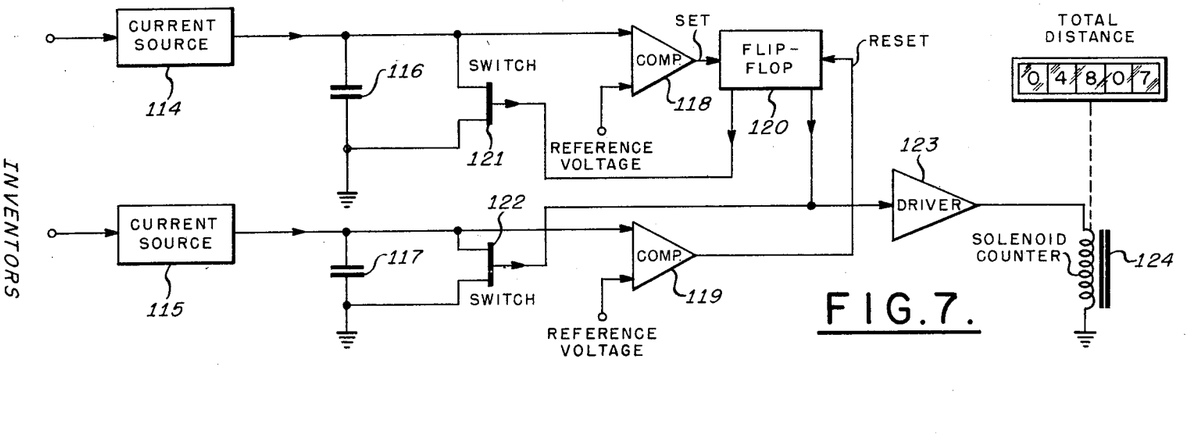
FIG. 7 is a block diagram of a summer that may be used with the invention.

FIG. 7 is a block diagram of a summer circuit 36 that may be used in practicing the invention.

The summer accepts resultant incremental distance signals from the right-triangle computer 34, sums these signals to produce increments of distance, for example yards or fractions of a nautical mile, and drives a counter to provide an indication of the total distance traveled.

Rectified pulses from the rectifiers 106 and 107 in the right triangle computer 34 are applied to current sources 114 and 115 in the summer. The current sources provide suitable currents for charging capacitors 116 and 117. The charges on the capacitors 116 and 117 are applied to comparators 118 and 119 respectively and balanced against suitable reference voltages. The output of the comparator 118 is used to set a flip-flop 120 and the output of the comparator 119 is used to reset the same flip-flop. The output signals from the flip-flop 120 are used to actuate switches 121 and 122 which serve to short out the corresponding capacitors 116 and 117. The output of the flip-flop 120 is also applied through a driver 123 to a solenoid counter 124.

It will be noticed that the switches 121 and 122 are operated in a push-pull fashion since they are coupled to output terminals of a flip-flop 120. The capacitor across a closed switch is short circuited and cannot accumulate a charge. The other capacitor, however, accumulates incremental charge during each pulsation of the voltage from the associated rectifier in the right-triangle computer. The amount of this incremental charge is determined by the magnitude of this pulsating voltage, which in turn, is determined by the incremental distance traversed during the measuring interval. As the capacitor charge reaches the comparator reference voltage, the comparator output switches, thereby changing the state of the flip-flop. This serves to discharge the charged capacitor through the closed switch and to permit the other capacitor to accumulate charge, so as to repeat the cycle. The cycling of the flip-flop actuates the solenoid counter and increases the indication of total distance traveled. The cycling rate thus increases with increasing incremental distances.

In considering the overall operation of the present invention, assume that the acoustic generators and receivers are oriented along the fore-aft and port-starboard axes. Assume further that the vessel is making headway but experiencing drift to starboard, and that normal operation is being experienced: That is, there is no turbulence or undue disturbance of the acoustic waves.

The power oscillator energizes the acoustic generators so as to produce four acoustic beams that are reflected from the bottom and picked up by the acoustic receivers.

Since the vessel is moving, the acoustic beams will experience a Doppler shift. Since the vessel has components of motion in the forward and starboard directions, the forward and starboard acoustic receivers 8 and 10 of FIG. 1 will detect an increase in frequency whereas the aft and port acoustic detectors will detect a decrease in frequency.

Electrical input signals corresponding to the received acoustic signals will be applied to the appropriate incremental distance computers 14 and 16 and to the spectrum evaluator 15 (FIG. 1).

During this operation, signals from the temperature sensor 17 and the power oscillator 6 are applied to the temperature and frequency compensator 18. This compensator produces synchronizing pulses on the sync line at a repetition rate equal to the oscillator frequency and DC voltages on the "up" and "down" current lines having magnitudes representative of the water temperature.

Consider now the operation of the incremental distance computer 14. Fore-aft input signals are applied to the input terminals 50 and 51 of the incremental distance computer (FIG. 4). These signals are heterodyned, digitized in comparators 54 and 58 and steered to appropriate AND gates by the polarity separator 61.

When the interval generator provides an interval gate signal, the pulses from the polarity separator 61 are applied to the appropriate clocked flip-flop. Succeeding sync pulses that are generated by the temperature and frequency compensator trigger the clocked flip-flop into the SET state for a period of time equal to 50 sync pulse periods thus permitting blocks of "up" and "down" currents to pass to the "up" and "down" switches 73 and 74. Each of these blocks, it will be remembered, equals 50 oscillator cycles. Throughout the operation of the navigator, the interval generator 19 operates to produce interval gate signals and discharge pulses. It will be further remembered that the present example assumed a situation in which no extraneous disturbances occurred so that information would be updated during each measurement interval. Under these conditions, UPDATE signals will be applied to the interval generator from the spectrum evaluator and UPDATE pulses will be produced during each cycle.

Charge is applied to the working capacitor 75 through the current sources 76 and 77 during the occurrence of appropriate current gating signals. Thus, still assuming forward motion of the vessel, and further assuming that the direction of motion tends to produce "up" pulses, each "up" pulse from the separator 61 that occurs during the measurement interval produces an "up" current gating pulse of controlled duration that permits a block of charge to accumulate on the working capacitor 75. Since the number of "up" pulses during a measurement interval increases as the distance traveled during that interval increases, the working capacitor 75 will charge to a level indicative of the incremental distance traveled during that interval.

The magnitude of the charging current is determined by the "up" and "down" current from the temperature and frequency compensator 18. Thus the energy available to charge the working capacitors during each charging pulse is compensated for variations in water temperature and oscillator frequency since the magnitude of the charging pulses is a function of water temperature and the duration of the charging pulses is a function of oscillator frequency.

At the termination of a measurement interval, the interval gate signal from the interval generator is terminated, thus blocking the flow of "up" and "down" pulses through the gates 64 and 65.

It was originally assumed in the present example that the operation was normal in that no unusual turbulence or other external effects occurred during the measurement. Under these conditions, the spectrum evaluator 15 (FIG. 5) produces an UPDATE signal on line 30 which is applied to the AND-gate 42 in the interval generator 19. This permits an UPDATE pulse to be gated out of the interval generator at the termination of the measurement interval and to be applied to the UPDATE switch 79 in the incremental distance computer. The readout capacitor 80 (FIG. 4) then charges to a value representative of the charge accumulated on the working capacitor 75 during the measurement interval.

Two milliseconds later the UPDATE pulse is terminated and a DISCHARGE pulse is produced as the multivibrators 40 and 43 of the interval generator (FIG. 2) are switched. The DISCHARGE pulse closes the discharge switch 78 in the incremental distance computer (FIG. 4) so as to discharge the working capacitor.

At the termination of the DISCHARGE pulse, the flip-flop 41 in the interval generator (FIG. 2) is again switched to the SET state and a new measurement interval is initiated.

At this time, a voltage exists across the readout capacitor 80 that represents the forward distance traveled by the vessel during the measurement interval. Since the vessel was assumed to also have a drift to starboard, the corresponding readout capacitor in the port-starboard incremental distance computer will also be charged. The voltage across this capacitor, however, will be representative of the transverse distance traveled by the vessel during the measurement interval.

The voltages across the readout capacitors in the incremental distance computers are applied to the choppers 98 and 99 in the right-triangle computer (FIG. 6). The values of the two rectangular waves are applied in quadrature to the adder 102 and converted to a resultant incremental distance pulses for application to the summer circuit 36. The pulses from the rectifier 106 are also filtered and applied to the comparator 95 in the spectrum evaluator (FIG. 5).

Assume now, that excessive deterioration of the acoustic signal occurs because of serious aeration of the water, turbulence or the like.

The resulting dispersion of the acoustic beam effectively broadens the spectrum of signals sensed at the acoustic sensors. This produces an abnormally high rate of "zero-crossings" in the signal from the comparator 88 of the spectrum evaluator (FIG. 5). The differentiator 89 then supplies pulses to the AND-gate 90 at a high repetition rate so that an unusually large number of switching pulses is supplied to the switch 93 during a measurement interval. In this manner, an abnormally high voltage appears across the capacitor 94 at the end of the measurement interval, the threshold of the comparator 95 is exceeded, and a RETAIN signal is produced at the output of this device. The RETAIN signal disables the AND-gate 42 in the interval generator (FIG. 2) and prevents the flow of an UPDATE pulse from that gate to the update switch 79 in the incremental distance computers (FIG. 4).

Thus under these circumstances, the charge accumulated on the working capacitor 75 of the incremental distance computer is disregarded and the charge previously accumulated on the readout capacitor 79 of the incremental distance computer is substituted as an estimate of the distance traveled during the measurement interval in which the faulty indication occurred.

The readout comparator voltage continues to be applied to the right-triangle computer as long as the spurious condition exists. The summer circuit (FIG. 7) continues to add equal incremental distances to the total distance traveled indicator as though the vessel continued to move at a constant rate during such intervals. In effect, then, the navigator is operating in a "dead reckoning" mode during such intervals.

In the event the spectrum evaluator is not used, an "update" or "retain" signal may be applied manually to control change or retention of the incremental distances computed. If "update" is indicated permanently, possible deterioration of signal—and resulting error—are ignored and accepted.

We claim:

1. A Janus-type sonar Doppler navigator comprising
   acoustic transmitting and receiving means for launching and receiving pairs of continuous acoustic beams along the fore-aft and port-starboard axes of a vessel,
   means for establishing predetermined measurement intervals independent of said transmitting means,
   means for producing first and second dual pulse trains during said predetermined measurement intervals, said pulse trains having repetition rates indicative of the velocity of the vessel in the fore-aft and port-starboard directions respectively,
   means for producing first and second incremental distance signals indicative of the number of pulses occurring in the first and second pulse trains respectively, during said predetermined measurement interval,
   means for storing said incremental distance signals, and
   means for combining said first and second incremental distance signals to provide an indication of the total distance traversed by the vessel during said predetermined measurement interval.

2. The apparatus of claim 1 further including
   water temperature responsive means coupled to said means for producing the first and second pulse trains and arranged to vary the amplitude of the pulses in said trains in accordance with the variations in water temperature.

3. The apparatus of claim 2 further including
   an oscillator for driving said acoustic-transmitting means, and
   means to adjust the duration of the pulses in said first and second pulse trains in response to changes in the frequency of said oscillator.

4. The apparatus of claim 3 wherein the means to adjust the duration of the pulses in said trains includes
   means to count the oscillations of said oscillator, and
   means to provide individual gating pulses during the time interval required for the occurrence of a specified number of said oscillations.

5. The apparatus of claim 4 wherein the means for producing the incremental distance signals is responsive to the total energy in the pulses occurring during the predetermined measurement interval.

6. The apparatus of claim 5 wherein the means for storing said incremental distance signals includes first and second working capacitors for storing information relating to the fore-aft and port-starboard distances traversed by said vessel respectively, and
   wherein the means for producing first and second incremental distance signals includes current source means for producing electrical currents of a specified magnitude and switching means for coupling current from said current source means to said first and second working capacitors during the occurrence of individual pulses in said first and second pulse trains group.

7. The apparatus of claim 6 wherein said predetermined measurement interval is established by an interval generator, said interval generator including
   means to produce interval gating pulses having a duration that is long with respect to the duration of the pulses in said pulse trains, said interval generator further including
   means to produce a discharge signal prior to the initiation of an interval gating pulse, said apparatus further including
   means to permit the formation of said first and second pulse trains during the occurrence of an interval gating pulse, said apparatus further including
   means to discharge said working capacitors in response to a discharge pulse.

8. The apparatus of claim 7 further including
   spectrum evaluator means to determine the spectral width of the received acoustic signals, said spectrum evaluator including threshold means to provide an UPDATE signal when the spectrum width of the received acoustic signals remains less than a threshold value and to produce a RETAIN signal when the spectrum width of the received acoustic signals exceeds the threshold value.

9. The apparatus of claim 8 further including
   first and second readout capacitors selectively coupled to said first and second working capacitors through individual UPDATE switches, said readout capacitors providing voltages for utilization in said combining means.

10. The apparatus of claim 9 wherein said interval generator further includes
    UPDATE gating means, and means to enable said UPDATE gating means at the termination of an interval gating pulse, said UPDATE gating means being connected to couple an UPDATE signal from said spectrum evaluator to said UPDATE switches, said UPDATE switches being arranged to conduct current from said working capacitors to said readout capacitors in response to an UPDATE signal.

11. The apparatus of claim 10 wherein said means to combine said first and second incremental distance signals includes
    means to sense the voltages of said readout capacitors,
    a chopping oscillator,
    first and second choppers for converting the voltage on each of said readout capacitors to a rectangular wave,
    quadrature phase-shifting means coupled to said chopping oscillator,
    means to actuate one of said choppers directly from said chopping oscillator,
    means to actuate the other of said choppers from said phase shifting means,
    adding means to add the voltages from said choppers,
    means to convert the voltage from said adding means to a sinusoidal wave, and
    means to indicate the magnitude of said sinusoidal wave.

12. The apparatus of claim 11 further including
    a flip-flop in said combining means, said flip-flop being connected to the set when the voltage from said phase-shifting means crosses the zero axis in a first direction, said flip-flop being further connected to the reset when the sinusoidal voltage crosses the zero axis in the opposite direction, and
    means to indicate the duty cycle of the rectangular wave output of said flip-flop.

13. Apparatus for determining the horizontal motion of a vessel with respect to the bottom of the body of water in which the vessel is traveling comprising
    propagating means for launching acoustic waves angularly downward from the hull of the vessel,
    said propagating means including first and second acoustic generators arranged to launch a first pair of correlative beams of acoustic energy having oppositely directed horizontal components of propagation lying in a first vertical plane oriented at a first fixed angle with respect to the longitudinal axis of the vessel,
    said propagating means also including third and fourth acoustic generators arranged to launch a second pair of correlative beams of acoustic energy having oppositely directed horizontal components of propagation lying in a second vertical place oriented at a second fixed angle with respect to the longitudinal axis of the vessel,
    acoustic signal reception means arranged to respond to said beams after reflection from said bottom, said reception means including means to produce individual electrical signals corresponding to each of said acoustic beams, first and second incremental distance computers coupled to receive the electrical input signals corresponding to the first and second pairs of correlative acoustic beams respectively, means in each of said incremental distance computers to produce an "up" pulse train when the frequency of a first of the associated input signals is higher than the frequency of the second of the associated input signals and a "down" pulse train when the frequency of said first input signal is lower than the frequency of the second of said input signals, said "up" and "down" pulse trains having a repetition rate equal to the frequency difference between said input signals, means to produce said "up" and "down" current gating signals having a specified duration in response to "up" and "down" gating pulses respectively, a working capacitor, "up" and "down" direct current sources for charging said working capacitor to first and second polarities respectively, means to connect said "up" and "down" current sources across said working capacitor in response to said "up" and "down" current gating signals respectively, readout means for indicating the desired navigational information, computational means for converting the magnitude of the charges on said working capacitors into signals required by said readout means, and transfer means for applying signals to said computational means from said working capacitors.

14. An improved sonar Doppler navigator of the type employing means for launching and receiving first and second pairs of correlative acoustic beams along first and second axes of a vessel, an oscillator for driving said launching means, transducer means for converting the received acoustic signals to corresponding pairs of correlative electrical input signals, signal-processing means responsive to received acoustic signals, and computational means responsive to said signal-processing means for providing readout indications corresponding to the received acoustic signals, said signal-processing means comprising:

A. An interval generator for providing timing pulses having a duration equal to a desired measurement time interval, B. First and second incremental distance computers coupled to receive first and second pairs of correlative input signals respectively, each of said incremental distance computers including:

1. Means for providing a train of "up" pulses when the frequency of a first of the input signals applied to that incremental distance computer is higher than the frequency of the second of the input signals applied thereto, 2. Means for providing a train of "down" pulses when the frequency of said first input signal is lower than that of the second input signal, 3. First gating means for passing said "up" and "down" pulse trains during the occurrence of a timing pulse from said interval generator, 4. Second gating means coupled to receive signals from said first gating means, 5. Frequency-dividing means for providing switching signals having a duration equal to a predetermined number of cycles of said oscillator, said second gating means being responsive to pass signals during the occurrence of a switching signal, 6. A working capacitor, 7. "Up" and "down" current sources for charging said working capacitor to first and second polarities respectively, 8. Means to connect said "up" and "down" current sources to said working capacitor during the occurrence of "up" and "down" pulses, respectively, from said second gating means, and 9. Means to apply the voltage across said working capacitor to said computational means after each measurement interval.

15. An improved sonar Doppler navigator of the type employing means for launching and receiving first and second pairs of correlative acoustic beams along first and second axes of a vessel, an oscillator for driving said launching means, transducer means to convert the received acoustic signals to corresponding pairs of correlative electrical input signals, signal-processing means responsive to received acoustic signals, and computational means responsive to said signal-processing means for producing readout indications corresponding to the received acoustic signals, said signal-processing means comprising:

A. An interval generator for providing timing pulses having a duration equal to a desired measurement time interval, B. First and second incremental distance computers coupled to receive first and second pairs of correlative input signals respectively, each of said incremental distance computers including:

1. Means for providing a train of "up" or "down" pulses when the frequency of a first of the input signals received by that incremental distance computer is higher or lower respectively than the frequency of the second of the input signals received by that incremental distance computer, 2. A working capacitor, 3. "Up" and "down" current sources for charging said capacitor to first and second polarities respectively, 4. "Up" and "down" gating means responsive to pulses in said "up" and "down" pulse trains respectively for selectively connecting said "up" and "down" current sources to said working capacitor, 5. First and second serially connected gates in said gating means, said first gate being opened only during the occurrence of a timing pulse, 6. Frequency-dividing means responsive to signals from said oscillator for opening said second serially connected gate for periods of time equal to a predetermined number of cycles of said oscillator, and 7. Means to apply the voltage across said working capacitor to said computational means after each measurement interval.

16. The apparatus of claim 15 further including immersible temperature-sensing means, means to produce "up" and "down" direct currents having magnitudes representative of the temperature sensed by said sensing means, said "up" and "down" direct currents being coupled to said "up" and "down" current sources respectively so as to vary the charging rate of said working capacitor in accordance with the magnitude of the associated direct current.

17. The apparatus of claim 16 wherein the means to provide trains of "up" and "down" pulses includes individual input means to receive said first and second input signals respectively, first heterodyne means to mix the two signals received by the associated incremental distance computer, means to shift the phase of a portion of a first of the signals received by the associated incremental distance computer by 90°, second heterodyne means to mix the phase shifted signal with the second of the signals received by the associated incremental distance computer, means to convert the difference frequencies of the signals from said heterodyne means to corresponding rectangular waves, means to differentiate the rectangular waves produced by said first heterodyne means, sampling means for sampling the polarity of the rectangular waves produced at the output of said second heterodyne means during the occurrence of positive-going pulses from said differentiating means, and polarity separating means for steering positive-going sampled pulses to an "up" pulse line and negative-going pulses to a "down" pulse line.